United States Patent
Martinez et al.

(10) Patent No.: US 10,121,513 B2
(45) Date of Patent: Nov. 6, 2018

(54) DYNAMIC IMAGE CONTENT OVERLAYING

(71) Applicant: INTERNATIONAL BUSINESS MACHINES CORPORATION, Armonk, NY (US)

(72) Inventors: Anthony E. Martinez, Orcas, WA (US); Vanessa V. Michelini, Boca Raton, FL (US); Vishwa Persaud, Woodbridge, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 31 days.

(21) Appl. No.: 15/251,557

(22) Filed: Aug. 30, 2016

(65) Prior Publication Data

US 2018/0061456 A1 Mar. 1, 2018

(51) Int. Cl.
*G11B 27/036* (2006.01)
*G11B 27/34* (2006.01)
(Continued)

(52) U.S. Cl.
CPC ........ *G11B 27/036* (2013.01); *G06K 9/00744* (2013.01); *G11B 27/34* (2013.01);
(Continued)

(58) Field of Classification Search
CPC .. G11B 27/036; G11B 27/34; G06K 9/00744; H04N 21/23424; H04N 21/23439; H04N 21/2668; H04N 21/812; H04N 21/8146
(Continued)

(56) References Cited

U.S. PATENT DOCUMENTS 8,331,697 B2 * 12/2012 Sambousky ........... G06T 15/50
348/580
8,531,308 B2 9/2013 Dickie et al.
(Continued)

FOREIGN PATENT DOCUMENTS

WO 2012141700 10/2012

OTHER PUBLICATIONS

2D Image Morphing Algorithms, http://davis.wpi.edu/~matt/courses/morph/2d.htm, accessed Jun. 16, 2016, 6 pages.
(Continued)

*Primary Examiner* — Thai Tran
*Assistant Examiner* — Stephen Smith
(74) *Attorney, Agent, or Firm* — Brian Restauro; Andrew D. Wright; Roberts Mlotkowski Safran Cole & Calderon, P.C.

(57) ABSTRACT

Systems and methods for dynamic image content overlaying are disclosed. In embodiments, a computer-implemented method comprises analyzing one or more digital image frames for the presence of a placeholder, wherein the placeholder overlays a dynamic image space on a display object and includes a content identifier and a contour mesh; determining the content identifier; retrieving select image content based on the content identifier; determining an orientation of the dynamic image space; transforming the select image content to produce transformed image content that matches the contour mesh and the orientation of the dynamic image space; and replacing the placeholder with the transformed image content to produce a set of one or more embedded image frames.

19 Claims, 6 Drawing Sheets

(51) Int. Cl.
  *G06K 9/00* (2006.01)
  *H04N 21/81* (2011.01)
  *H04N 21/234* (2011.01)
  *H04N 21/2668* (2011.01)
  *H04N 21/2343* (2011.01)

(52) U.S. Cl.
  CPC . *H04N 21/23424* (2013.01); *H04N 21/23439* (2013.01); *H04N 21/2668* (2013.01); *H04N 21/812* (2013.01); *H04N 21/8146* (2013.01)

(58) Field of Classification Search
  USPC ......... 386/246, 278, 300; 235/494; 382/181; 725/36; 345/633; 348/580
  See application file for complete search history.

(56) References Cited

U.S. PATENT DOCUMENTS

| | | |
|---|---|---|
| 9,111,287 B2 | 8/2015 | Liu et al. |
| 2004/0100556 A1 | 5/2004 | Stromme |
| 2004/0194128 A1 | 9/2004 | McIntyre et al. |
| 2007/0079331 A1 | 4/2007 | Datta et al. |
| 2009/0094637 A1 | 4/2009 | Lemmons |
| 2011/0188836 A1* | 8/2011 | Popkiewicz ........... G06Q 30/02 386/278 |
| 2013/0019261 A1* | 1/2013 | Huber .................... G06Q 30/08 725/32 |
| 2016/0042262 A1* | 2/2016 | Tanaka ................. G06K 7/1417 235/494 |
| 2016/0171773 A1* | 6/2016 | Hara .................... G06T 19/006 345/633 |
| 2017/0201779 A1* | 7/2017 | Publicover ........... H04N 21/252 |

OTHER PUBLICATIONS

Kameraflage The Big Picture Technology Demo License Press, http://kameraflage.com/, Kameraflage Inc., 2007-2013, accessed Jun. 16, 2016, 1 page.

Kameraflage , https://en.wikipedia.org/wiki/Kameraflage, accessed Jun. 16, 2016, 1 page.

\* cited by examiner

DYNAMIC IMAGE CONTENT OVERLAYING

BACKGROUND

The present invention relates generally to embedding content into digital images and, more particularly, to dynamic image content overlaying.

With the rise in popularity of digital video recording devices (DVRs), subscription-based television programming, and different media viewing options, sponsors (advertisers) are looking for alternatives to conventional television advertising blocks. One option for sponsors is embedded advertising, wherein a product or logo associated with the sponsor is used in the making of a video (e.g., television show). There have been some attempts to make embedded advertising more versatile by digitally embedding advertising content into a video during post-production. However, problems exist with respect to inserting customized advertising content on three dimensional advertising objects or display objects in motion within a video. Digital billboards and projected advertising are other options utilized by advertisers; however, these methods do not address the idea of allowing dynamic and customized advertising on wearable clothing or objects in motion.

In the world of sports, athletes often exhibit branding pertaining to their sponsors. This is especially evident in automobile racing, bicycle motocross (BMX) racing, professional skiing events, golf and tennis. This branding is typically affixed to the bikes, racecars, uniforms, hats, gloves, shoes, or other articles where a spectator's attention, and especially a video camera, may be trained. Excepting broadly recognized brands, such branding often has very narrow recognition and impact, especially widely in broadcast events. Also, the real estate for displaying such branding is quite limited. Some venues use computerized display billboards to address the real estate issue, but this "one message for all" still limits the issue of resonance with a particular audience. Moreover, it many cases it may be undesirable to constrain advertising to a physical billboard.

SUMMARY

In an aspect of the invention, a computer-implemented method includes: analyzing, by a computing device, one or more digital image frames for the presence of a placeholder, wherein the placeholder overlays a dynamic image space on a display object and includes a content identifier and a contour mesh; determining, by the computing device, the content identifier; retrieving, by the computing device, select image content based on the content identifier; determining, by the computing device, an orientation of the dynamic image space; transforming, by the computing device, the select image content to produce transformed image content that matches the contour mesh and the orientation of the dynamic image space; and replacing, by the computing device, the placeholder with the transformed image content to produce a set of one or more embedded image frames.

In another aspect of the invention, there is a computer program product for dynamic image content overlay. The computer program product comprises a computer readable storage medium having program instructions embodied therewith. The program instructions are executable by a computing device to cause the computing device to: analyze a digital video stream for the presence of a placeholder, wherein the placeholder overlays a dynamic image space on a display object and includes a content identifier and a contour mesh; determine the content identifier; retrieve select image content from a content database based on the content identifier; determine an orientation of the dynamic image space; transform the select image content to produce transformed image content that matches the contour mesh and the orientation of the dynamic image space; and replace the placeholder with the transformed image content to produce an embedded digital video stream.

In another aspect of the invention, there is a system for dynamic image content overlay The system includes a CPU, a computer readable memory and a computer readable storage medium associated with a computing device; program instructions to record a digital image stream of a moving display object, the digital image stream comprises frames; program instructions to analyze the digital video stream in real time during the recording for the presence of a placeholder, wherein the placeholder overlays a dynamic image space on the display object and includes a content identifier and a contour mesh; program instructions to determine the content identifier; program instructions to retrieve select image content from a content database based on the content identifier; program instructions to determine an orientation of the dynamic image space for each frame of the digital image stream in which the placeholder is present; program instructions to transform the select image content to produce transformed image content that matches a contour mesh and an orientation of the dynamic image space for each frame of the digital image stream in which the placeholder is present; and program instructions to replace the placeholder with the transformed image content for each frame of the digital image stream in which the placeholder is present to produce an embedded digital video stream. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
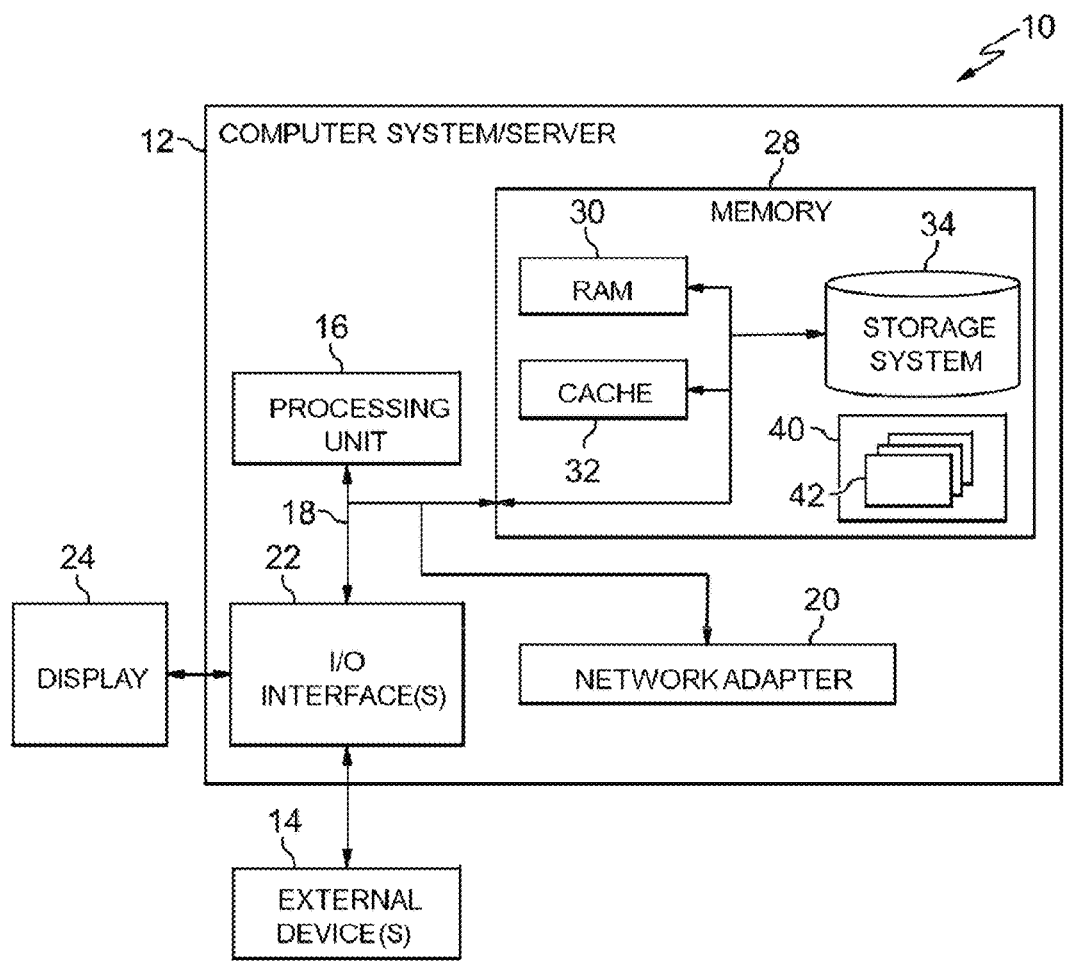
FIG. 1 depicts a computing infrastructure according to an embodiment of the present invention.

The present invention relates generally to embedding content into digital images and, more particularly, to dynamic image content overlaying. In embodiments, a system and method is provided that opens up new opportunities in branding and advertising through the use of contextual branding that can be digitally superimposed on allocated display real estate that is worn or utilized in a recorded or streaming event, such as a sporting event. In aspects, special markers or glyphs and a mesh showing where the advertisement or branding would be digitally replaced or superimposed delineates the real estate for dynamic advertisement. These markers are recognized in a digital video file via computer methods, and processed in real time (for live events) or post-processed (e.g., for print, rebroadcast or other media) so that the appropriate branding/advertisement (e.g., branding/advertisement targeted for particular audience) is inserted into the digital video file. For example, branding may be superimposed over dynamic image spaces when images of a sporting event are run through special software in a smart photography camera, smart video camera or in video processing at a broadcast studio.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
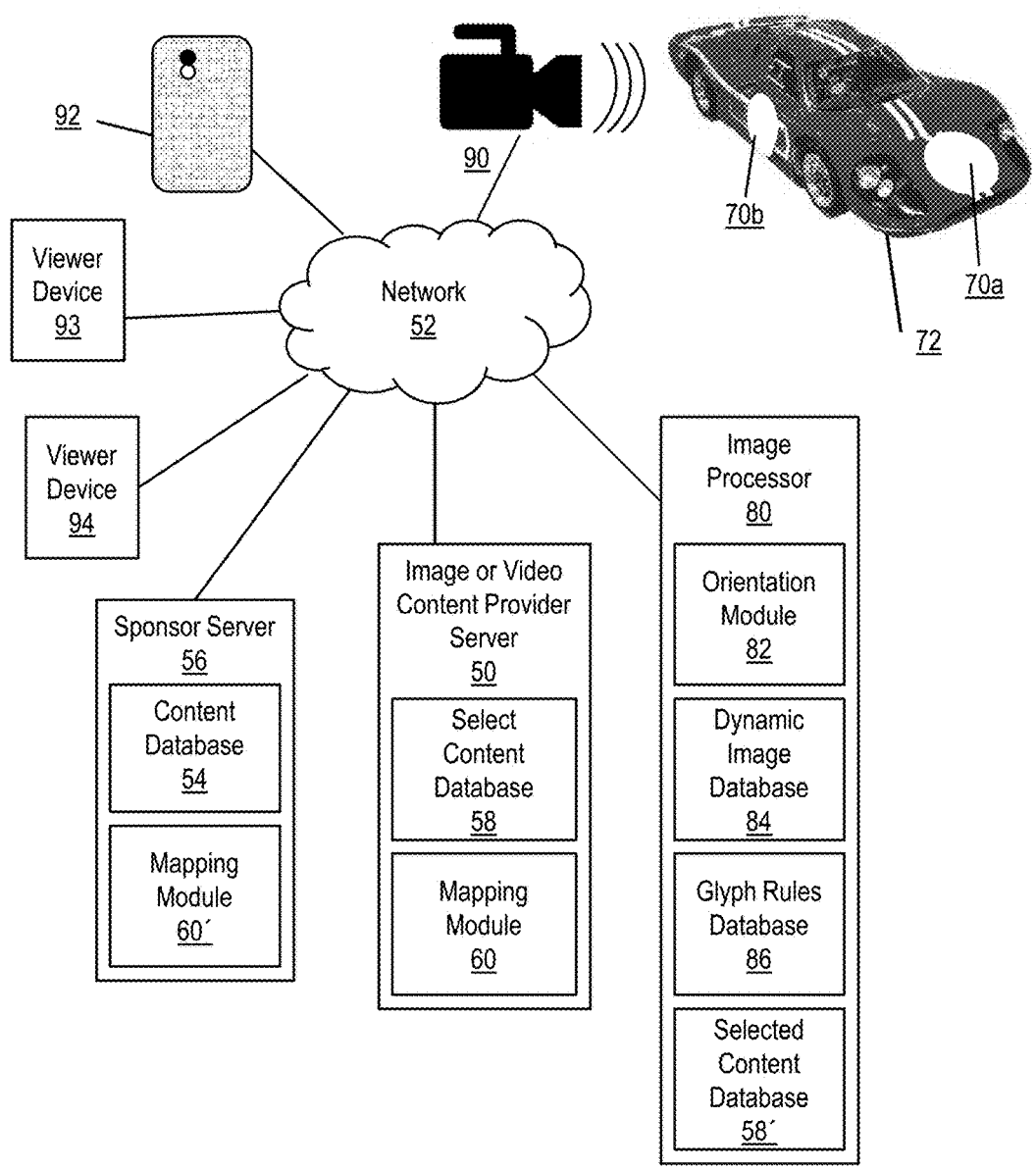
FIG. 2 shows an exemplary environment in accordance with aspects of the invention.

FIG. 2 shows an exemplary environment in accordance with aspects of the invention. The environment includes an image or video content provider server 50 (hereafter provider server 50) connected to a network 52. The provider server 50 may comprise a computer system 12 of FIG. 1, and may be connected to the network 52 via the network adapter 20 of FIG. 1. The provider server 50 may be configured as a special purpose computing device. For example, the provider server 50 may be configured to receive selected sponsor or advertising images (hereafter select image content) from a content database 54 of a sponsor server 56, via the network 52, and save the select image content in a select content database 58. In aspects, the provider server 50 selectively maps the select image content to available dynamic image spaces 70a, 70b of a display object 72 (e.g., an automobile, a billboard, a blimp, the side of a curb, etc.), utilizing a mapping module 60. The image content can be an advertising image, such as a logo, trademark, or any other imagery that a sponsor or the like wishes to embed into a video or image file or video or image stream. As used herein, the term dynamic image space is intended to mean a predefined space (e.g., space 70a) on a display object or portion of an object (e.g., a race car 72) whose image is or will be captured, and on which sponsor content may be superimposed to provide for dynamically embedded video or image content.

The network 52 may be any suitable communication network or combination of networks, such as a local area network (LAN), a general wide area network (WAN), and/or a public network (e.g., the Internet). The sponsor server 56 may be a general purpose computing device, such as a desktop computer, laptop computer, tablet computer, smartphone, etc. In embodiments, the sponsor server 56 utilizes its own mapping module 60' to map select image content from the content database 54 to one or more dynamic image spaces 70a, 70b.

Still referring to FIG. 2, the mapping modules 60, 60' may include one or more program modules (e.g., program module 42 of FIG. 1) executed by the provider server 50 or sponsor server 56. In embodiments, the mapping module 60, 60' is configured to match a unique image content identifier with a dynamic image space identifier.

Still referring to FIG. 2, in aspects, an image processor 80 in communication with one or more mapping modules 60, 60' (such as through network 52) includes an orientation module 82, a dynamic image database 84 and a glyph rules database 86. In aspects, the image processor 80 includes its own select content database 58' for storing select image content therein. The image processor 80 may be a special computing device including elements of computer device 12. The image processor 80 may be part of an image recording device (e.g., professional video recording device, smart phone, etc.), or may be in communication with an image recording device 90, such as through network 52. In embodiments, an image or video recording of a display object 72 generated by the image recording device (e.g., image recording device 90) is processed by the image processor 80 to incorporate select image content from the select image content database 58, 58' into one or more image frames to create digitally embedded image content. The resulting image file with embedded image content may be broadcast or streamed to one or more viewer devices 92-94, such as through network 52. The viewer devices 92-94 may be general purpose computing devices, such as desktop computers, laptop computers, tablet computers, smart phones, etc., and may include components of computer device 12.

Figure 3:
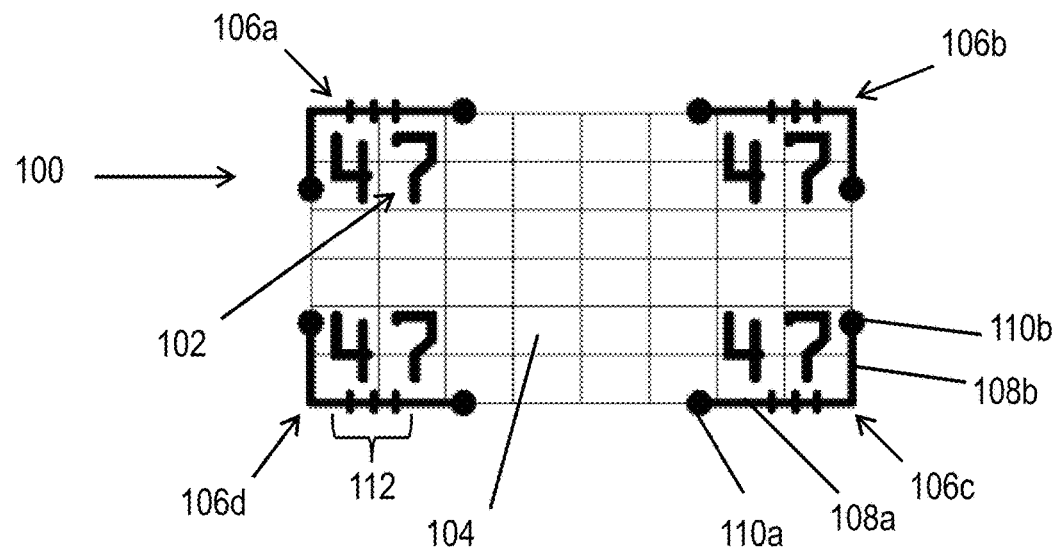
FIG. 3 shows an image placeholder in accordance with aspects of the invention.
Figure 4:
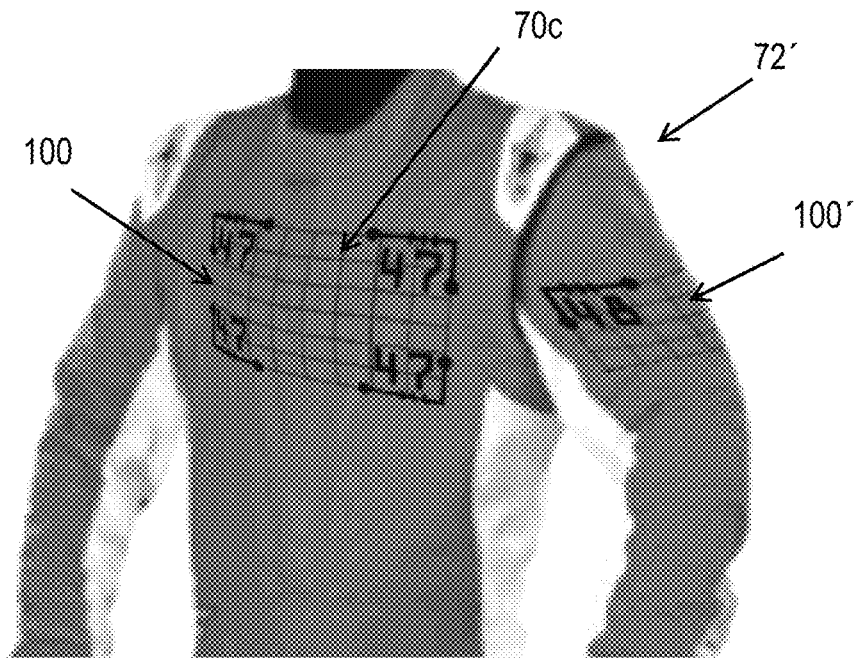
FIG. 4 shows image placeholders of the present invention on a display object.

FIG. 3 depicts an image placeholder 100, which is placed over a dynamic image space (represented at 70c in FIG. 4), and is utilized by the image processor 80 in accordance with image processing methods of the present invention. In embodiments, the placeholder 100 is physically present on the display object (e.g., display object 72' in FIG. 4). For example, placeholder 100 may be painted on an automobile, or printed on a t-shirt or other clothing, ironed onto a display object, applied as a decal on a surface of the display object 72, 72', etc. One or more placeholder (e.g., 100, 100') may be present on a display object, as depicted in FIG. 4.

In embodiments, the placeholder (e.g., 100, 100') comprises a contour mesh (represented at 104 in FIG. 3) with one or more corner glyphs (106a-106d). As used herein, the term "glyph" means a marker comprising a character or symbol. The corner glyphs 106a-106d may be different dimensions and scales, depending on their use. The contour mesh 104 is utilized during processing of an image file to transform select image content (e.g., a logo) to match contours and skew of the display object (e.g., 72, 72') defining the dynamic image space (e.g., 70a, 70b). In this way, the transformed select image content will follow twists and turns of the display object such that portions of the select image content may be visually obscured or otherwise appear as if the transformed select image is actually located on the display object. A single corner glyph (e.g., 106a) contains the information necessary to determine the content intended for the dynamic image space (e.g., 70a, 70b), the dimensions of the dynamic image space, and the orientation of the advertising space. Further, each corner glyph (e.g., 106a) is uniquely identifiable even when rotated. In the scenario where multiple corner glyphs (e.g., 106a-106d) are used (e.g., on the hood of a race car), having at least one corner glyph visible to an image recording device 90 is sufficient for the image processor 80 to obtain necessary information regarding the dynamic image space (e.g., 70a, 70b). Depending on the display object bearing the placeholder (e.g., object curvature, size, shape, etc.), a single corner glyph (e.g., 106a) can be utilized, or two-four corner glyphs (e.g., 106a-106d) can be utilized. For example, on the sleeve of an athlete's jersey, if there is not sufficient space for all four glyphs (106a-106d), then only a single corner glyph (e.g., 106a) may be utilized.

Each glyph 106a-106d comprises a content identifier 102, which is a logical identifier used to represent a single piece of content or series of content, which can be a single brand, an athlete, a team, an athlete-brand combination, a rotating series of products, etc. The content identifier 102 is used during image processing of the dynamic image space (e.g., 70a, 70b) to determine which select image content should occupy the placeholder space. In a simple case, a single content identifier 102 maps to a single image (e.g., a sponsor company's logo). In a more complex example, a single content identifier 102 can represent periodically changing content. By way of example, content identifier 102 can map to a rotating sequence of images corresponding to a company's products.

In aspects, each corner glyph 106a-106d comprises two dimension lines 108a, 108b, with respective end caps 110a, 110b. Each dimension line 108a, 108b depicts a relative height and width of the associated dynamic image space (e.g., 70a, 70b), and therefore, any content to be superimposed thereon. For example, one dimension line can be twice the length of the other dimension line to represent a content image to be superimposed thereon that is twice as wide as it is tall. The end caps 110a, 110b allow the image processor 80 to determine whether the entire dimension line 108a, 108b is visible in a video or image frame.

In aspects, each corner glyph 106a-106d includes one or more scale marks indicated at 112 in FIG. 3. Scale marks 112 define a factor by which to size select image content relative to the dimension lines 108a, 108b. Interpreting the scale marks 112 can be done in a flexible way during image processing. For example, scale marks 112 may be interpreted as "3×" scale. In other example, the image processor 80 can treat one notch=2× scale, two notches=5× scale, three notches=10× scale, or whatever scale is appropriate for a given situation and display object (e.g., 72, 72').

Glyph uniqueness is determined based on relative locations of elements within the glyph, and specifically, the position of content identifier 102 relative to the dimension lines 108a, 108b. For example, if optical character recognition (OCR) processing by image processor 80 detects a content identifier 102, then by adjusting for any rotation of content identifier 102 and factoring in the relative placement of dimension lines 108a, 108b against the content identifier 102, each of the four corner glyphs 106a-106d can be uniquely identified. The bottom right corner glyph 106c, in this example, would have dimension lines located to the bottom and right of the content identifier "47" after accounting for rotation.

If an event being recorded has a live audience, the glyphs (e.g., 106a-106d), content identifier 102 and mesh 104 may be embedded in a default content image using conventional technology that is invisible to human eyes and visible with digital cameras. In this scenario, a live audience will see the default content image (e.g., company logo) only, while the glyphs 106a-106d, mesh 104 and content identifier 102 would be visible to the image processor.

Figure 5A:
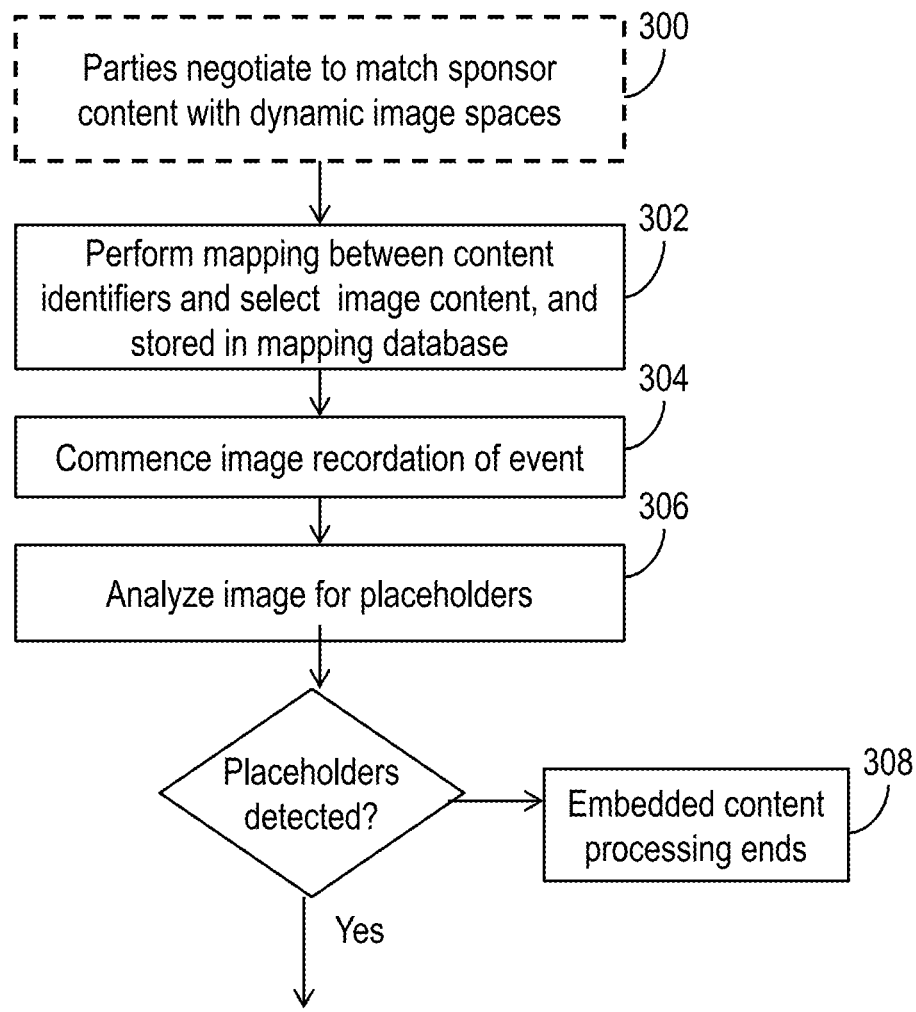
FIGS. 5A and 5B show a flowchart of steps of a method in accordance with aspects of the invention.
Figure 5B:
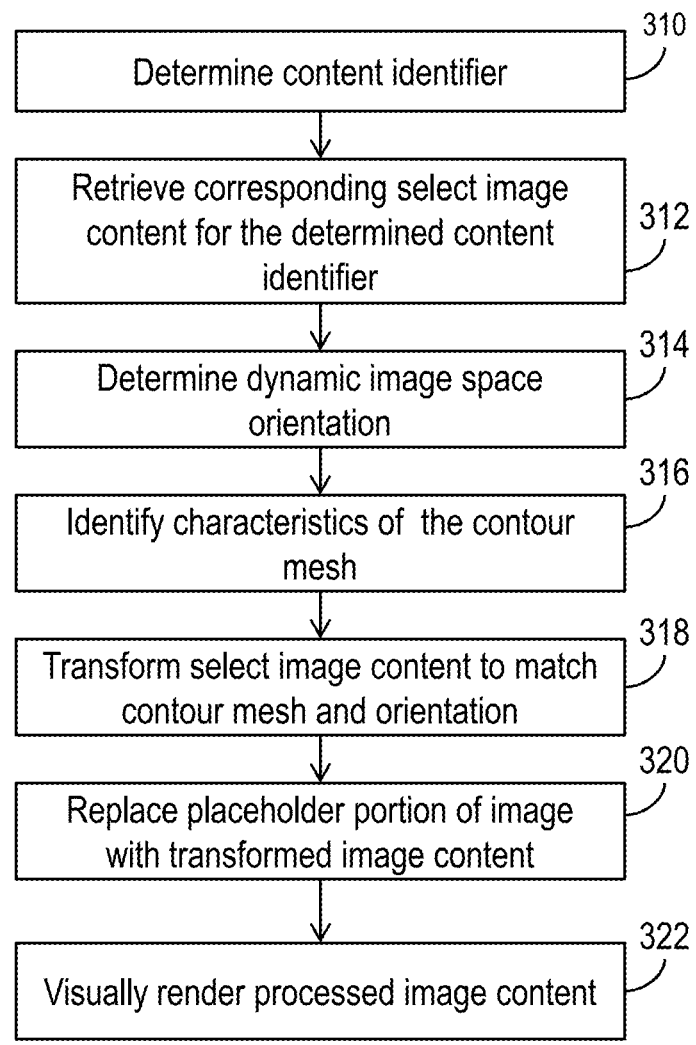

FIGS. 5A and 5B show a flowchart of a method in accordance with aspects of the invention. Steps of the method of FIGS. 5A and 5B may be performed in the environment illustrated in FIG. 2, and utilizing the placeholder 100 of FIG. 3, and are described with reference to elements shown in FIGS. 2 and 3.

At an optional first step 300, a video content provider (e.g., owner of video content provider server 50) negotiates with one or more sponsors (e.g., owner of sponsor server 56), to match select image content (e.g., ad or logo) from a content database 54 with one or more available dynamic image spaces (e.g., 70a, 70b). The select image content is then stored in the selected content database 72 of the image processor 70.

At step 302, the mapping module 58, 58' performs a mapping function to map identifiers of dynamic image space to select image content, and the mapping data is stored in a database (not shown) of the mapping module 60, 60', or in the dynamic imaging database 84.

At step 304, an image recordation event commences, wherein at least one display object 72, 72' having one or more predefined dynamic image spaces 70a, 70b is recorded. This image recording may be obtained through a professional image recording device 90, for example. Digital images contemplated for use in the present invention could be a single digital image frame or multiple digital image frames. It should be understood that steps 306-320 discussed below may be performed for each frame in a digital video stream, such that a resultant embedded digital video stream may include embedded select image content in a plurality of frames.

At step 306, the image processor 80 analyzes image data of the image recorded at step 304 to detect the presence of one or more placeholders 100, 100'. In aspects of the invention, the image processor 80 utilizes OCR processing to recognize a content identifier (e.g., 102), and thereby recognize the presence of a placeholder (e.g., 100, 100').

If no placeholders 100, 100' are detected at step 306, then at step 308 the embedded content processing of the present invention ends. If one or more placeholders 100, 100' are detected at step 306, then the embedded content processing of the present invention continues at step 310, as shown in FIG. 5B.

More specifically, at step 310, the image processor 80 identifies a content identifier (e.g., 102 in FIG. 4) associated with each placeholder 100, 100'. The step of determining the content identifier may be accomplished using conventional processing methods, such as OCR processing. For example, OCR processing can be utilized to recognize the content identifier 100 of "47" depicted in FIGS. 3 and 4.

At step 312, the image processor 80 retrieves select image content for the determined content identifier 102. In aspects, image processor 80 accesses a database of a mapping module (e.g., 60, 60') to determine which select image content is a match for the content identifier determined (e.g., 102) at step 310. In embodiments, the image processor 80 accesses the dynamic image database 84 to retrieve the select image content for the identifier 102.

In aspects, the glyph rules database 86 may also be utilized to determine which select image content to retrieve based on predefined rules stored therein. Rules may include, for example, rules regarding viewer locations, viewer device types, time zones, language preferences, advertising costs, etc. In one example, the glyphs rules database 86 includes rules to use a first type of branding for a broadcast intended for a first geographic region (e.g., a broadcast within the United States), and rules to use a second type of branding for a broadcast intended for a second geographic region (e.g., a broadcast within the United Kingdom). In embodiments, step 312 is continuously or periodically performed by the image processor 80 such that select image content shown in an image stream may change dynamically accordingly to rules within glyph rules database 86.

In embodiments, the glyph rules database 86 may include rules for a triggering event, wherein when the image processor 80 becomes aware of a triggering event, the image processor will retrieve select image content for the determined content identifier 102 at step 312 based on information in the glyph rules database 86. By way of example, a triggering event may be a manual signal sent by a viewer of an event to the image processor 80, wherein the signal indicates that a new display object (e.g., 72, 72') is being highlighted and is considered prime advertising real estate. Based on rules in the glyph rules database 86, the image processor 80 then changes the select image content to be overlaid on the new display object.

At step 314, the image processor 80 determines orientation of the dynamic image space (e.g., 70c). More specifically, the information imparted by one or more glyphs (e.g., 106a-106d) is utilized by the image processor 80 to determine the orientation of the advertising space. In aspects, dynamic image space orientation is determined based on the orientation of a corner glyph (e.g., 106a-106d) and its dimension lines 108a, 108b. For example, if a bottom right corner glyph 106c is visible and detected by image processor 80 to be rotated 45 degrees clockwise, then the select image content to be overlaid thereon will be rotated 45 degrees clockwise.

At step 316, the image processor 80 identifies characteristics of the contour mesh 104 of placeholder 100. Conventional contour algorithms and mesh warping tools may be utilized in conjunction with this step of the present system.

At step 318, the image processor 80 transforms the select image content retrieved at step 312 to match the contour and orientation of the placeholder 100. The image processor 80 may determine a relative height and wide of an associated dynamic image space (e.g., 70a, 70b) using dimension lines 108a, 108b of a respective placeholder (e.g., 100, 100'), and therefore, any content to be superimposed thereon. For example, one dimension line can be twice the length of the other dimension line to represent a content image to be superimposed thereon that is twice as wide as it is tall. The end caps 110a, 110b allow the image processor 80 to determine whether the entire dimension line 108a, 108b is visible in a video or image frame. Further, the scale marks 112 define a factor by which to size select image content relative to the dimension lines 108a, 108b. Thus, digital placement of the select image content atop each of the glyphs in an image frame, following the contour meshes, with appropriate twisting, bending and obscuration, yields a realistic final result, even for display objects in motion.

At step 320, the image processor 80 overlays the transformed select image content over the placeholder 100 in the image or video frame to produced one or more embedded image frames (embedded digital image data).

At step 322, the processed image or video frames of step 320 are rendered to a viewer, such as through broadcasting video or image data to viewer devices 92-94. In aspects, the image processor 80 employs processing techniques of the present invention to live or recorded image streams comprising single frames (e.g., digital photograph) or multiple continuous frames (e.g., a digital video), augmented reality (e.g., viewed through a smartphone or headset), or other computer environments, or digital displays (e.g., sports stadium displays). Thus, it can be understood that steps 306-320 can be conducted in real time during the recording of image data.

In aspects, one or more image processors 80 are utilized to process video or image data captured by an image capture device 90 in a manner the yields parallel simultaneous embedded image data streams, wherein each embedded image data stream includes different select image content (e.g., different logos, etc.). Likewise, an image processor 80 of the present invention may copy one or more image frames (image recording data) before overlaying a transformed image content over the one or more image frames at step 320. In this way, multiple streams of images may be simultaneously overlaid with different transformed image content by the image processor 80 at step 320, resulting in multiple embedded image streams that may be broadcast to different viewers.

Figure 6A:
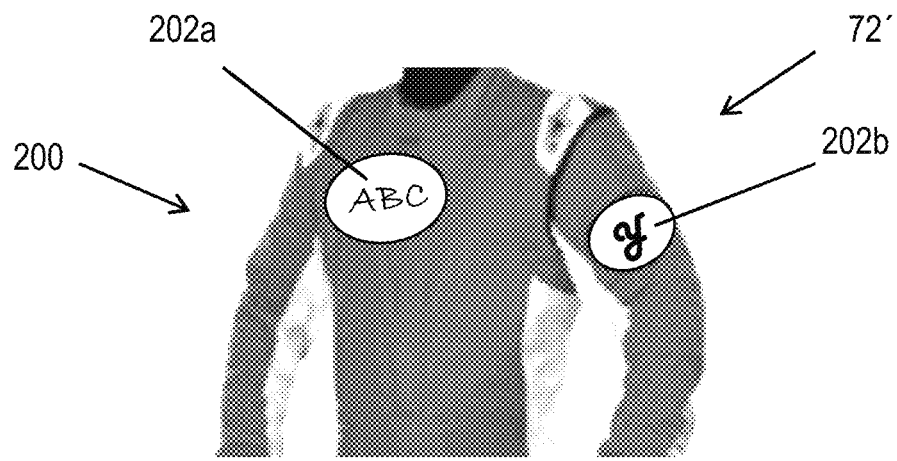
FIGS. 6A and 6B show processed images of the display object of FIG. 4, wherein the images are different from one another.
Figure 6B:
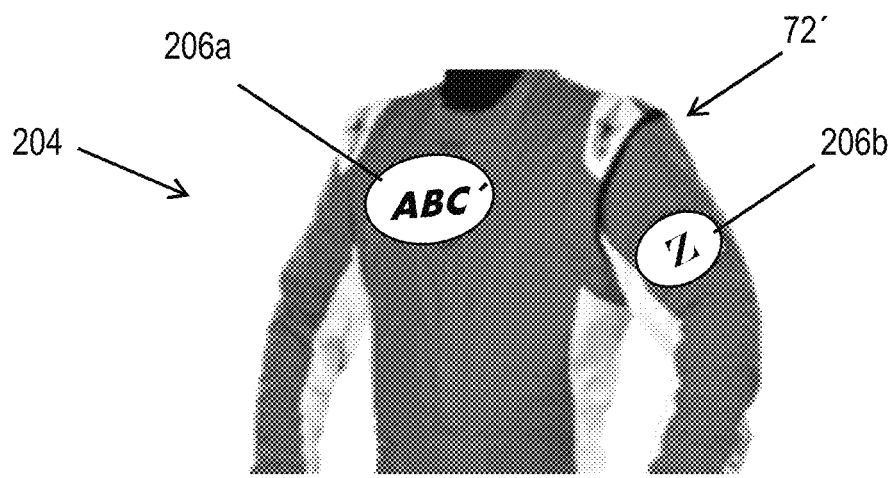

FIGS. 3, 6A, and 6B will now be referenced with respect to an exemplary scenario, wherein two embedded image data streams are generated to produce different images during an automobile racing event. In this scenario, a participant at an event views a race car driver having a racing jacket 72' with placeholders 100, 100', as depicted in FIG. 4. Optionally, default content may be incorporated with the placeholders 100, 100' in a manner that conveys sponsorship images or the like to the viewer while also providing the placeholders 100, 100' for recognition by the image processor 80. A person looking directly at the jacket 72' would see 100, 100' and/or default content (in the event the default content is incorporated in with the placeholder 100). However, if the person were to view an image of the same jacket 72' in a stadium display device, the placeholders 100, 100' of the jacket 72' would have been digitally replaced with select image content appropriate for the audience of the automobile racing event. It should be understood that the select image content displayed on the image of the jacket 72' may be changed at any time during the automobile racing event. For example, a triggering event may occur that causes the image of the jacket 72' to display different select image content if the wearer of the jacket 72' is identified as the winner of the race. The same person viewing the race live may see yet another version of the jacket image if they chose to view the event from a mobile device. Likewise, another person viewing the same racing event on their television may see yet another version of the jacket image, depicting different select image content.

Advantageously, the present invention enables a sponsor to target different viewers in different ways in a dynamic manner. By way of example, if the exemplary automobile racing event were broadcast simultaneously in the United States and the United Kingdom, it would be advantageous for a sponsor to customize the image of the racers jacket 72' depending on the target viewer. In the present scenario, a first image 200 (shown in FIG. 6A) broadcast in the United States includes logos 202a, 202b for two brands (e.g., ABC, Y), which are displayed over respective placeholders 100, 100' (shown in FIG. 3) of the jacket 72'. Simultaneously, in a second image 204 broadcast in the United Kingdom, logos 206a, 206b for the two brands (e.g., ABC', Z) are displayed over respective placeholders 100, 100' of the jacket 72'. It can be understood that the logo 202a shown in FIG. 6A is associated with Unites States' branding while the logo 206a shown in FIG. 6B is associated with United Kingdom branding. The manner in which different brands are selected for display to different viewers may be accomplished in a number of ways, and the present invention is not limited to a particular way of matching viewers with sponsors and/or sponsor content.

In the context of sporting events, advantages of the present invention include the ability of freelance athletes to negotiate ad space with multiple sponsors at different sporting events. Moreover, players may be able to negotiate with multiple sponsors to receive maximum compensation for branding placement based on their athletic performance. Additionally, the present invention enables a sponsor to purchase many dynamic image spaces (advertising placements), then dynamically move their branding around their purchased real estate (e.g., from a first race car to a lead race car during a racing event) thereby ensuring maximal video coverage of their brand.

Advantageously, the dynamic image spaces of the present invention may be superimposed over existing branding so that audiences physically present at a live event can visually see the existing affixed branding, while broadcast or video recording viewers can see the dynamic advertising placement (which may be different for different viewing audiences). Thus, it can be understood that sponsors may choose to change the branding based on which market the video (e.g., event) is being broadcast. For example, if a viewer is watching television in the United States, the viewer may see a different style or brand or advertisement emblazoned on a player's jersey then a view who is watching television in the United Kingdom. This may be beneficial, for example, when a trademark for a company is different in different countries (e.g., the United States logo is different from the United Kingdom logo). Of course, it should be appreciated that the placeholder 100 of the present invention can be utilized for other forms of advertising then depicted herein, such as flags or banners, or in embodiments outside of the advertising space.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that desired to advertise. In return, the service provider can receive payment from the customer(s) under a subscription and/or fee agreement and/or the service provider can receive payment from the sale of advertising content to one or more third parties.

In still another embodiment, the invention provides a computer-implemented method for dynamic image content overlay. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
analyzing, by a computing device, one or more digital image frames for the presence of a placeholder, wherein the placeholder overlays a dynamic image space on a display object and includes: a content identifier; a contour mesh conveying information regarding the contours and skew of the display object; and at least one corner glyph comprising the content identifier bracketed by a first dimension line and a second dimension line, the first dimension line and second dimension line intersecting at a right angle, a first end cap on the first dimension line, a second end cap on the second dimension line, and one or more scale marks on the first dimension line, wherein the content identifier is a number;
determining, by the computing device, the content identifier;
retrieving, by the computing device, select image content based on the content identifier;
determining, by the computing device, an orientation of the dynamic image space;
transforming, by the computing device, the select image content to produce transformed image content that matches the contour mesh and the orientation of the dynamic image space; and
replacing, by the computing device, the placeholder with the transformed image content to produce a set of one or more embedded image frames.

2. The method of claim 1, further comprising:
mapping the content identifier to the select image content to obtain mapping data; and
saving the mapping data in a mapping database.

3. The method of claim 1, further comprising recording, by the computing device, the one or more digital image frames, wherein the analyzing the one or more digital image frames is performed in real time during the recording.

4. The method of claim 1, further comprising visually rendering the set of one or more embedded image frames to a viewer.

5. The method of claim 1, wherein the determining the orientation of the dynamic image space includes determining an orientation of the at least one corner glyph of the placeholder.

6. The method of claim 5, wherein the placeholder includes a plurality of corner glyphs.

7. The method of claim 5, further comprising determining a scale of the dynamic image space based on the first and second dimension lines and the one or more scale marks of the corner glyph.

8. The method of claim 1, further comprising:
copying, by the computer device, the one or more digital image frames to produce a second set of digital image frames including a copied placeholder;
retrieving, by the computing device, second select image content based on the content identifier;
transforming, by the computer device, the second select image content to produce second transformed image content that matches the contour mesh and the orientation of the dynamic image space; and
replacing, by the computer device, the copied placeholder with the second transformed image content to produce a second set of one or more embedded image frames, wherein the select image content and the second select image content are different, resulting in differences between the set of one or more embedded image frames and the second set of one or more embedded image frames.

9. A computer program product for dynamic image content overlay, the computer program product comprising a computer readable storage medium having program instructions embodied therewith, the program instructions executable by a computing device to cause the computing device to:
analyze a digital video stream for the presence of a placeholder, wherein the placeholder overlays a dynamic image space on a display object and includes: a content identifier; a contour mesh conveying information regarding the contours and skew of the display object; and at least one corner glyph comprising the content identifier bracketed by a first dimension line and a second dimension line, the first dimension line and second dimension line intersecting at a right angle, a first end cap on the first dimension line, a second end cap on the second dimension line, and one or more scale marks on the first dimension line, wherein the content identifier is a number;
determine the content identifier;
retrieve select image content from a content database based on the content identifier;
determine an orientation of the dynamic image space;
transform the select image content to produce transformed image content that matches the contour mesh and the orientation of the dynamic image space; and
replace the placeholder with the transformed image content to produce an embedded digital video stream.

10. The computer program product of claim 9, wherein the program instructions further cause the computing device to:
map the content identifier to the select image content to obtain mapping data; and
save the mapping data in a mapping database.

11. The computer program product of claim 9, wherein the program instructions further cause the computing device to record the digital video stream, wherein the analyzing the digital video stream is performed in real time during the recording.

12. The computer program product of claim 9, wherein the program instructions further cause the computing device to visually render the embedded digital video stream to a viewer.

13. The computer program product of claim 9, wherein the determining the orientation of the dynamic image space includes determining an orientation of the at least one corner glyph of the placeholder.

14. The computer program product of claim 13, wherein the placeholder includes a plurality of corner glyphs.

15. The computer program product of claim 9, wherein the program instructions further cause the computing device to identify characteristics of the contour mesh by determining a scale of the dynamic image space based on the first and second dimension lines and the one or more scale marks of the placeholder.

16. The computer program product of claim 9, wherein the program instructions further cause the computing device to:
- copy the digital video stream to produce a second set digital video stream including a copied placeholder;
- retrieve second select image content based on the content identifier;
- transform the second select image content to produce second transformed image content that matches the contour mesh and the orientation of the dynamic image space;
- replace the copied placeholder with the second transformed image content to produce a second embedded digital video stream, wherein the select image content and the second select image content are different, resulting in differences between the embedded digital video stream and the second embedded digital video stream.

17. A system for dynamic image content overlay comprising:
- a CPU, a computer readable memory and a computer readable storage medium associated with a computing device;
- program instructions to record a digital image stream of a moving display object, the digital image stream comprises frames;
- program instructions to analyze the digital video stream in real time during the recording for the presence of a placeholder, wherein the placeholder overlays a dynamic image space on the display object and includes a content identifier and a contour mesh;
- program instructions to determine the content identifier;
- program instructions to retrieve select image content from a content database based on the content identifier;
- program instructions to determine an orientation of the dynamic image space for each frame of the digital image stream in which the placeholder is present;
- program instructions to transform the select image content to produce transformed image content that matches a contour mesh and an orientation of the dynamic image space for each frame of the digital image stream in which the placeholder is present; and
- program instructions to replace the placeholder with the transformed image content for each frame of the digital image stream in which the placeholder is present to produce an embedded digital video stream;
- wherein the program instructions are stored on the computer readable storage medium for execution by the CPU via the computer readable memory; and
- wherein the placeholder further includes at least one corner glyph comprising the content identifier bracketed by a first dimension line and a second dimension line, the first dimension line and second dimension line intersecting at a right angle, a first end cap on the first dimension line, a second end cap on the second dimension line, and one or more scale marks on the first dimension line, wherein the content identifier is a number.

18. The system of claim 17, wherein the program instructions to determine the orientation of the dynamic image space include instructions to determine the orientation of the at least one corner glyph.

19. The system of claim 17, further comprising program instructions to identify characteristics of the contour mesh for each frame of the digital image stream in which the placeholder is present by determining a scale of the dynamic image space based on the first dimension line, the second dimension line, and the one or more scale marks of the at least one corner glyph.

* * * * *